United States Patent
Saleh et al.

(10) Patent No.: US 8,217,981 B2
(45) Date of Patent: Jul. 10, 2012

(54) CONFIGURING VIDEOCONFERENCING SYSTEMS TO CREATE VIDEO SESSIONS WITH REALISTIC PRESENCE

(75) Inventors: Youssef Saleh, Arlington, MA (US); Gopal Paripally, North Andover, MA (US); Mark Duckworth, Merrimack, NH (US); Kathy Chen, Windham, NH (US)

(73) Assignee: Polycom, Inc., Pleasanton, CA (US)

( * ) Notice: Subject to any disclaimer, the term of this patent is extended or adjusted under 35 U.S.C. 154(b) by 867 days.

(21) Appl. No.: 12/249,348

(22) Filed: Oct. 10, 2008

(65) Prior Publication Data
US 2009/0225152 A1    Sep. 10, 2009

Related U.S. Application Data

(60) Provisional application No. 60/979,533, filed on Oct. 12, 2007.

(51) Int. Cl.
*H04M 11/00* (2006.01)
(52) U.S. Cl. ..................... 348/14.01; 370/352
(58) Field of Classification Search .... 348/14.01–14.08, 348/14.1, 14.11, 14.12, 4.13, 14.9; 379/202.1; 370/352; 725/102
See application file for complete search history.

(56) References Cited

U.S. PATENT DOCUMENTS

| | | | | |
|---|---|---|---|---|
| 5,835,129 A * | 11/1998 | Kumar | ........................ | 348/14.09 |
| 7,034,860 B2 | 4/2006 | Lia et al. | | |
| 7,113,200 B2 * | 9/2006 | Eshkoli | ....................... | 348/14.07 |
| 7,742,068 B2 * | 6/2010 | Cupal et al. | ................ | 348/14.01 |
| 2005/0007446 A1 | 1/2005 | Schrader et al. | | |
| 2006/0002373 A1* | 1/2006 | Denny | ........................... | 370/352 |
| 2006/0087553 A1 | 4/2006 | Kenoyer | | |
| 2006/0156360 A1* | 7/2006 | Sato et al. | ...................... | 725/102 |
| 2006/0284786 A1 | 12/2006 | Takano | | |
| 2007/0171273 A1* | 7/2007 | Saleh et al. | ................. | 348/14.08 |

FOREIGN PATENT DOCUMENTS

JP    2000069461    3/2000

OTHER PUBLICATIONS

International Search Report and Written Opinion from PCT/US2008/079523, dated Dec. 22, 2008.
First Office Action for counterpart Chinese Appl. No. 200880117713.9, dated Nov. 9, 2011.

\* cited by examiner

*Primary Examiner* — Curtis Kuntz
*Assistant Examiner* — Maria El-Zoobi
(74) *Attorney, Agent, or Firm* — Wong, Cabello, Lutsch, Rutherford & Bruculerri, LLP (57) ABSTRACT

Methods and apparatuses for automating the interface of different videoconferencing systems are disclosed. In brief, according to one or more embodiments according to the invention, a first method comprises, upon connection of two videoconferencing systems, information containing the number and type of screens in each system is exchanged, and this information is used to set up custom camera and/or display settings in each local system.

34 Claims, 8 Drawing Sheets

16:9 IMAGES FROM 3-CAMERA SYSTEM SHOWN ON 4:3
DISPLAYS OF 2-CAMERA SYSTEM

*Figure 5A*

4:3 IMAGES FROM 4-CAMERA SYSTEM SHOWN ON 4:3
DISPLAYS OF 2-CAMERA SYSTEM

CONFIGURING VIDEOCONFERENCING SYSTEMS TO CREATE VIDEO SESSIONS WITH REALISTIC PRESENCE

CROSS-REFERENCE TO RELATED APPLICATIONS

This is a non-provisional of U.S. Provisional Application Ser. No. 60/979,533, filed 12 Oct. 2007, to which priority is claimed and which is incorporated herein by reference in its entirety.

FIELD OF THE INVENTION

The subject matter of the present disclosure relates to systems and methods for configuring videoconferencing systems by exchanging information between videoconferencing systems to create a videoconferencing session with a realistic presence.

BACKGROUND

Videoconferencing systems are increasingly being used to conduct meetings when not all participants are present at the same location. Typically, a user of a near-end videoconferencing system manually selects presets for the near-end system (e.g., selects the number or type of video displays) and manually adjusts one or more video cameras at the near-end system to interface with a far-end videoconferencing system. Manual configuration becomes increasingly difficult for users because the users must account for different features (i.e., the number of displays and corresponding monitors, the aspect ratio of each display, etc.) in different systems intended to interface with each other.

Clearly, designers of videoconferencing systems face a number of challenges in creating flexible videoconferencing systems that can seamlessly interface with other different videoconferencing systems. Users of these videoconferencing systems face related challenges, as mentioned above, in setting up their systems to seamlessly communicate with different systems. What is needed is a method for effectively automating the interface of different videoconferencing systems.

BRIEF DESCRIPTION OF THE DRAWINGS

FIGS. 1C-4B illustrate plan views of several arrangements for videoconferencing systems in accordance with the present disclosure.

FIGS. 5A-7B illustrate display configurations of several videoconferencing systems in accordance with the present disclosure.

DETAILED DESCRIPTION

A configuration process automates the configuration between different videoconferencing systems that have different configurations for handling (displaying and capturing) video for a videoconferencing session. When near and far-end videoconferencing systems are connected, the two systems exchange their configuration information indicative of the video handling capabilities of the systems. This configuration information can include the video capturing capabilities of the system, such as the number and position of cameras useable for capturing video, the aspect ratio used by the system for capturing video, and the field of view of the cameras (e.g., pan/tilt/zoom orientation of the cameras). The configuration information can also include video displaying capabilities of the system, such as the number and position of displays at the system available for displaying video and the aspect ratio used by the system for displaying video. The configuration information can be exchanged in detail, or the two systems can exchange an identification or some other indicia that the other system can then use to determine the system's configuration using a cross-reference look-up or the like. Once configuration information has been exchanged, each system uses the other system's information to set up custom camera and/or display settings to accommodate the other system's configuration. In this way, the two videoconferencing systems can create videoconferencing sessions that offer a realistic presence for participants without the need to manually adjust settings to get an acceptable configuration.

Figure 1A:
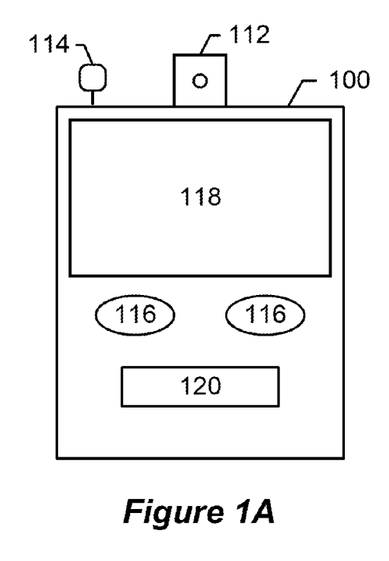
FIGS. 1A-1B illustrate a videoconferencing system in accordance with the present disclosure.

Turning to the drawings, a representative videoconferencing system 100 shown in FIG. 1A has a video camera 112, a microphone 114, speakers 116, a video display 118, and a control interface 120. While each of these components is shown in a particular physical configuration, the exact number, position, and capabilities of each of these components may vary, as will be discussed in detail below. Further, other components not shown in FIG. 1A may also be present in the videoconferencing system 100.

Figure 1B:
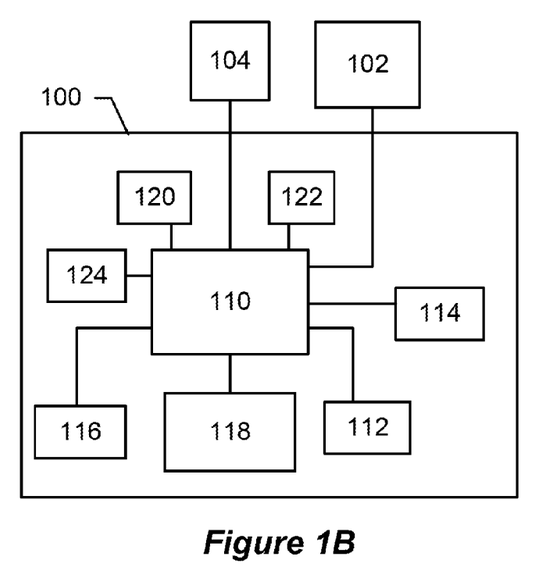

As schematically shown in FIG. 1B, the videoconferencing system 100 representing a near-end system can connect to one or more far-end videoconferencing systems 104. Additionally, the near-end system 100 can connect to one or more local videoconferencing systems 102. Functionally, the videoconferencing system 100 includes a control unit 110 to handle control and input/output (I/O) functions of the system 100. The control unit 110 can be, for example, a dedicated microprocessor system, or other combinations of hardware and/or software configured to control functions of the local videoconferencing system 100. The control unit 110 connects to the video camera 112, microphone 114, speaker 116, video display 118, user interface (e.g., control panel) 120, status display 122, and a compression/decompression unit (codec) 124. Each of these components is well-known in the art so that the operation of these components is only briefly discussed here.

While the near-end videoconferencing system 100 is shown connected to one local system 102, any number of such local systems may be connected to the near-end system 100. In such a situation, the near-end system 100 may serve as a master system to the other local systems 102 so it can control some of the functionality of the other systems 102. Thus, the codec 124 may serve as a primary codec for the combined systems 100, 102.

In use, the near-end system 100 communicates with the far-end system 104 using protocols well-known in the art, including H.224, H.225, H.281, H.261, H.263, H.320, H.323, etc. According to one or more embodiments, the near-end videoconferencing system 100 communicates configuration information to the far-end videoconferencing system 104 using a known signalling protocol (e.g., H.225). Likewise, the near-end system 100 can receive configuration information in a similar way from the far-end system 104.

In general, the configuration information exchanged between systems 100 and 104 is indicative of the video handling (displaying and capturing) capabilities or physical makeup of components available at the system. In other words, the configuration information describes the physical configuration or processing capabilities of the given system for displaying and capturing video signals for a videoconference session. For example, the configuration information can include how many video displays are available locally, the aspect ratio of the local video displays, the number and position of the local video cameras, the aspect ratio of the local video cameras and displays, etc.

In another example, the configuration information may be an identification or other such identifier of the system sending the information. For example, the identification can be a model number or other dataset that identifies the model of the system. Here, the primary codec in each system 100/104 can append such an identification (indicative of features such as aspect ratios of video displays and video cameras, and the numbers of displays and cameras available) to the software version string that is sent via the H.225 setup message to the other system. In turn, the systems 100/104 can use the identifications as indications of the configuration of the other system. In other words, a calling system (e.g., 100) sends a setup message via H.225, including its identification. In turn, the far-end system (e.g., 104) being called responds with a connect message via H.225, including its identification. Using the identifications, the systems 100 and 104 can use a cross-reference lookup in memory to determine the configuration of the other system. In this way, the configuration information may be sent as part of the setup message or as part of the connect message during setup of a videoconferencing session.

Based on the configuration information received from the far-end videoconferencing system, the near-end videoconferencing system (e.g., 100) automatically adjusts its video camera(s) 112 so that the video signals that the system 100 captures and sends corresponds to the available video display(s) on the far-end system 104 receiving the video signal. Adjustment of the video cameras 112 may include several aspects. For example, the near-end system 100 may automatically select some number of video cameras 112 to capture video out of a total number of available cameras. The selected number of cameras 112 may vary depending upon the capabilities of the far-end system 104, which will be discussed in further detail below. Further, the near-end system 100 may automatically select pan, tilt, and zoom settings for each camera 112 used to capture video signals. Optimally, these settings correspond to the video display capabilities of the far-end system 104.

Figure 1C:
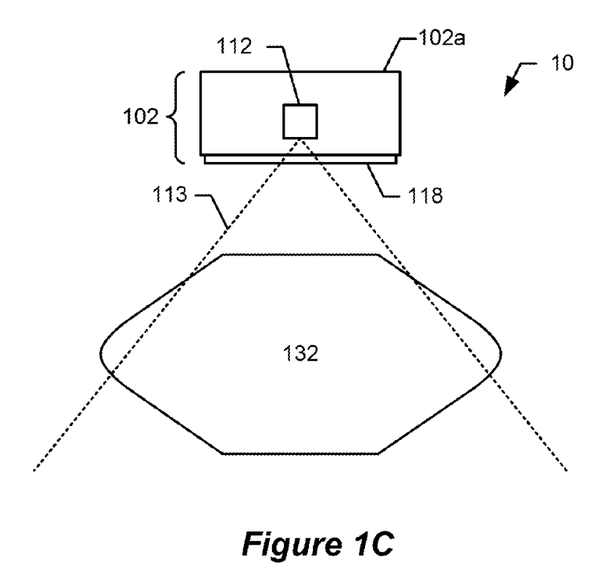

As shown in FIG. 1C, the videoconferencing system 100 having the video camera 112 and the video display 118 is positioned relative to a table 130 in front of the system 100. The field of view 113 of the video camera 112 may be adjusted by changing the pan, tilt, and/or zoom of the video camera 112, as mentioned briefly above. Thus, the field of view 113 of the camera 112 may be zoomed in to focus on a particular area or person, or zoomed out to encompass a larger area. Further, the camera 112 may be tilted up and down to emphasize different portions of the available field of view. Finally, the camera 112 may be panned from left to right to move the side boundaries of the available field of view. All of these functions can be performed by the videoconferencing system 100 based on configuration information from a far-end system (104).

Figure 2A:
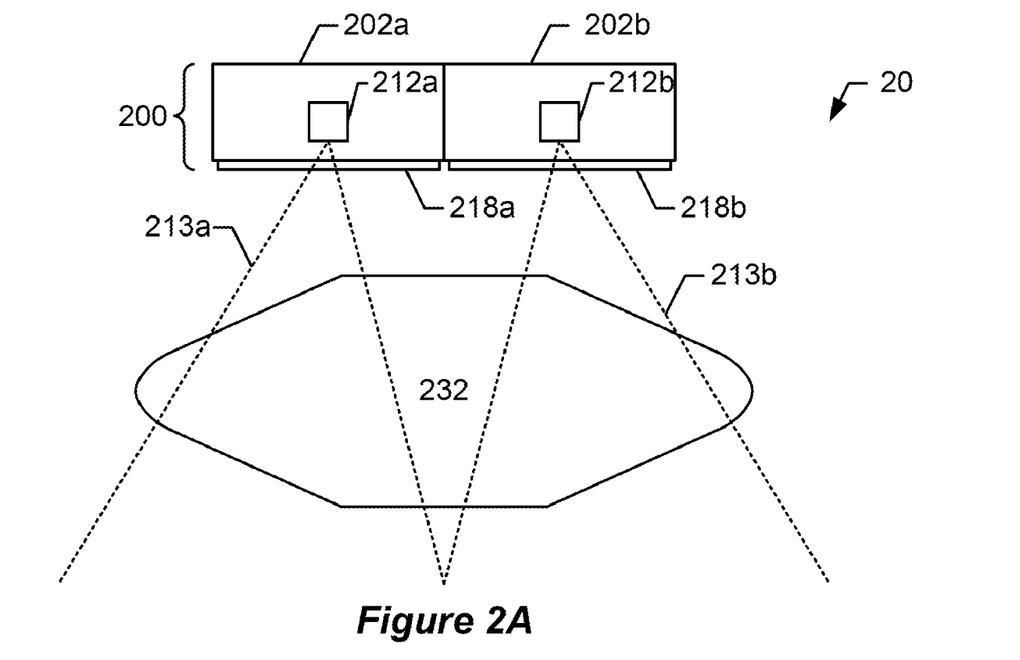
Figure 2B:
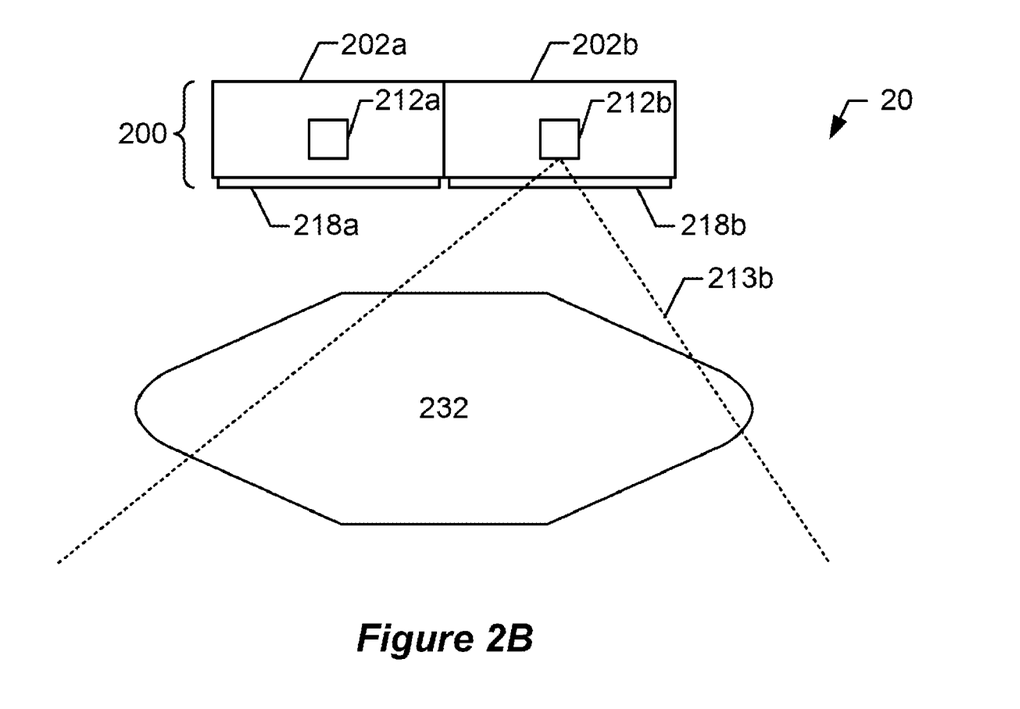

As videoconferencing systems become more complex, multiple videoconferencing systems may be combined into a functional unit, as mentioned above. In FIGS. 2A-2B, a videoconferencing system 200 has two videoconferencing components (100*a*-*b*)—both of which can be similar to the videoconferencing system 100 discussed above. As such, the system 200 has, among other elements, two video cameras 112*a*-*b* and two video displays 118*a*-*b*.

As shown in FIG. 2A, the two video cameras 112*a*-*b* are typically positioned such that each camera 112*a*-*b* has a different field of view 113*a*-*b*, allowing each camera 112*a*-*b* to capture video signals of different areas. The combination of the different captured video signals seamlessly encompasses a desired area to be broadcast to a far-end videoconferencing system. When the videoconferencing system 200 receives far-end video signals for display on its video displays 118*a*-*b*, local codecs (not shown) interpret the far-end video signals and display the video signals on the displays 118*a*-*b*. Optimally, the video captured by cameras at the far-end corresponds to a single, seamless image of a desired field of view, and the video displays 118*a*-*b* at the near-end system 200 display the video so that the single, seamless image appears on the video displays 118*a*-*b*.

In certain situations, it may be necessary to change the settings of the cameras 112*a*-*b* so they capture different field of views 113. In FIG. 2B, for example, the first camera 112*a* does not capture a video image for sending to the far-end, and the second camera 112*b* has a field of view 113 that encompasses all of the table 130. Such a setting may be desirable when the videoconference system 200 sends a video signal to a far-end system having only a single display, as with the system 100 of FIG. 1*c*.

Figure 3A:
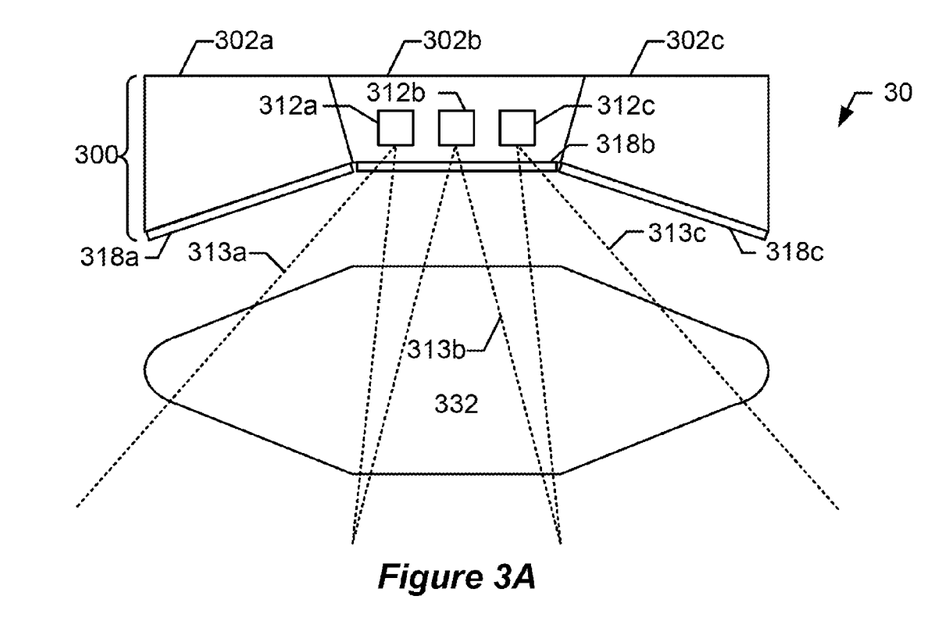
Figure 3B:
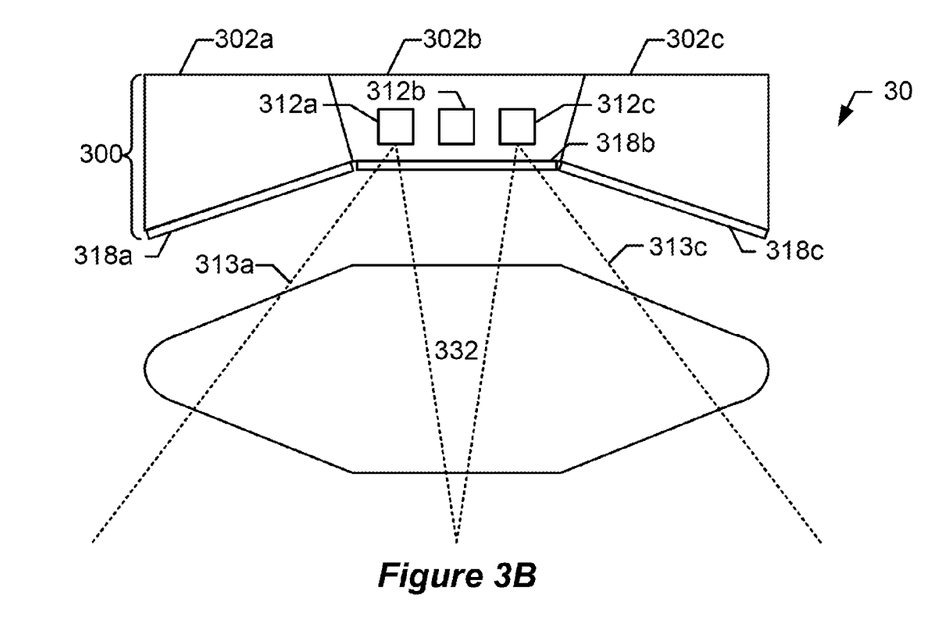

As shown in FIGS. 3A-3B, a videoconferencing system 300 has three videoconferencing components 100*a*-*c*—each of which is similar to the videoconferencing system 100 discussed above—and has, among other elements, three video cameras 112*a*-*c* and three video displays 118*a*-*c*. Similar to the discussion of FIGS. 2A-2B, the fields of view 113 of the cameras 112*a*-*c* may be changed depending on the configuration of the far-end system used in a videoconferencing session.

As shown in FIG. 3A, for example, when like systems are communicating (i.e., a near-end system 300 connected to a similar far-end system), all three cameras 112*a*-*c* may be used to broadcast one-third of the desired field of view. When the system 300 communicates with another far-end system having a different number of cameras and/or displays, the settings may be changed. For example, the cameras 112*a* and 112*c* may not be used when the near-end system 300 communicates with a far-end system having only a single video display (e.g., the system 100 of FIG. 1C). In this situation, the settings of the middle camera 112*b* may be adjusted so that its field of view 113*b* encompasses the entire table 130.

Alternatively, as shown in FIG. 3B, when the near-end system 300 communicates with a far-end system having only two video displays (e.g., the system 200 in FIGS. 2A-2B), the middle video camera 112*b* may not be used. Instead, the outer cameras 112*a*, 112*c* may be used, and the fields of view 113*a*, 113*c* may be adjusted to encompass the entire table 130. In other words, the settings of the cameras 112*a*, 112*b* are adjusted for optimal display on the video displays of the two-display system (200).

Figure 4A:
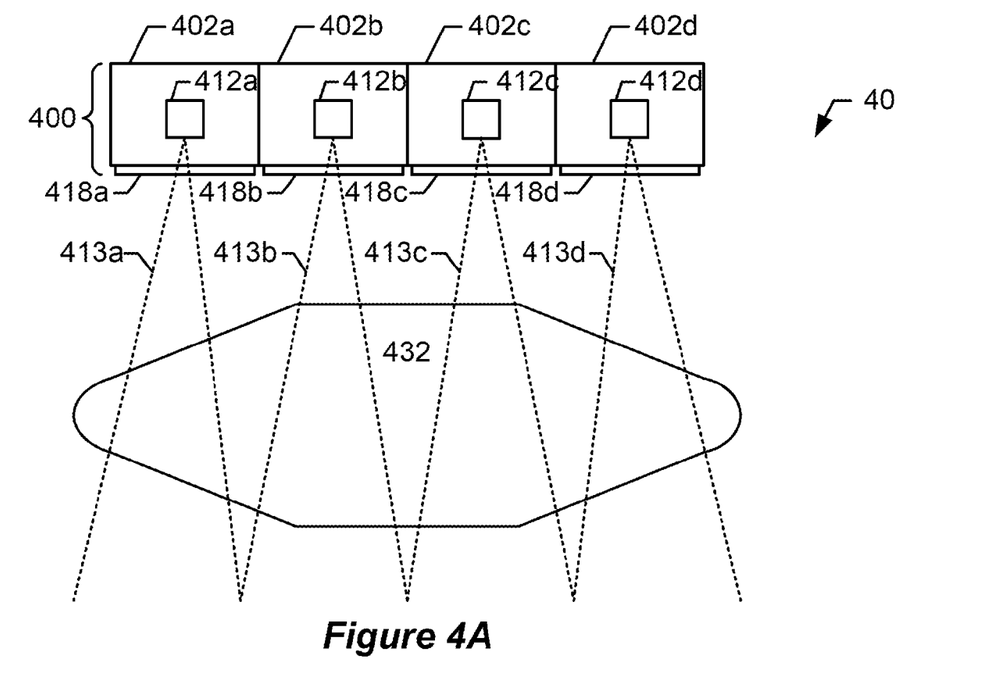
Figure 4B:
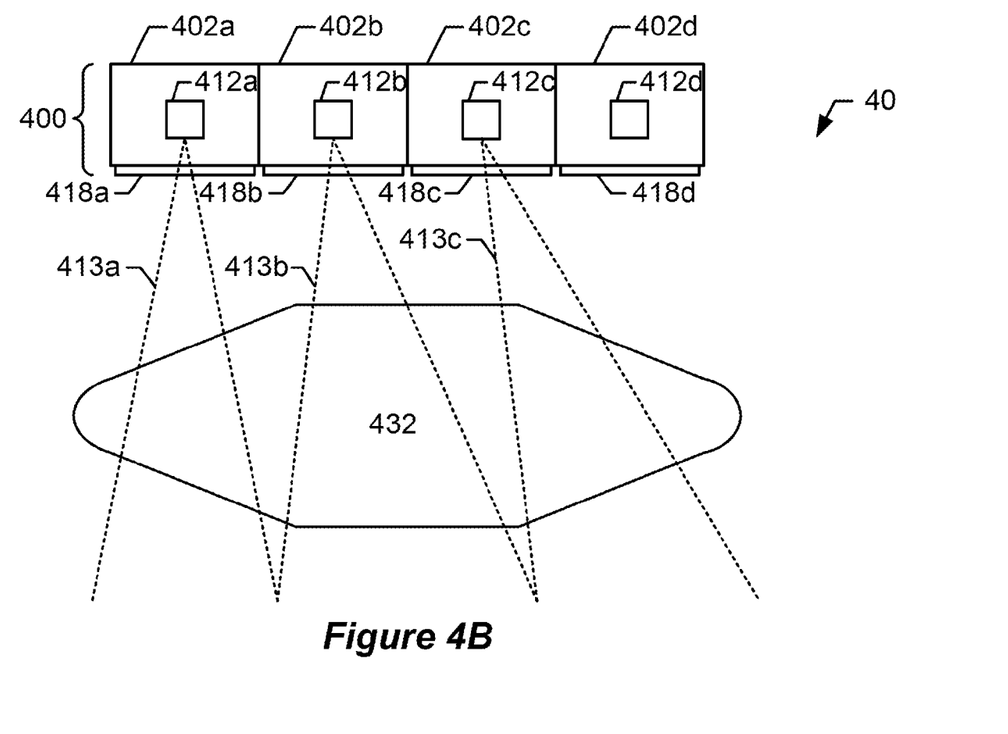

As shown in FIGS. 4A-4B, a videoconferencing system 400 has four videoconferencing components 100*a*-*d*—each of which can be similar to the videoconferencing system 100 discussed above—and has, among other elements, four video cameras 112*a*-*d* and four video displays 118*a*-*d*. It should be apparent after the discussions of the previous systems that the use of the cameras 112*a*-*d* may be adjusted depending on the number of cameras available locally and the number of displays available in a connected far-end videoconferencing system.

As shown in FIG. 4A, for example, when all four cameras 112*a-d* are used to transmit video signals, the fields of views 113*a-d* of the cameras 112*a-d* are set up such that each field of view 113*a-d* encompasses a portion of the desired area of the room, table 130, etc. Alternatively, when only two displays are available on a far-end system (e.g., as with system 200 in FIG. 2A), only cameras 112*b* and 112*c* may be used, while cameras 112*a* and 112*d* are not. The choice of these two cameras 112*b* and 112*c* may be preferable due to the fact that these cameras are more centrally located and thus offer a wider fields of view 113*b*, 113*c*, with less distortion than that of cameras 112*a* or 112*d*.

Alternatively, as shown in FIG. 4B, when the videoconferencing system 400 communicates with a far-end videoconferencing system having three displays (e.g., as with the system 300 in FIGS. 3A-3B), only three of the available four video cameras 112*a-d* are used, and the settings of these cameras 112*a-d* are adjusted for optimal display on the video displays of the three-display system (300). Other configurations of the cameras 112*a-d* are of course possible, depending on particular constraints defined by, for example, the size and geometry of the arrangement, the size and geometry of furniture in the surrounding room (e.g., table 130) the number of people present, and other factors.

With an understanding of how the exchanged configuration information can be used to correlate available cameras, fields of view, and displays between connected systems, discussion now turns to how the system's codec (or master codec) processes the video signals. When a near-end videoconferencing system (e.g., 100; FIG. 1B) receives captured video signals, its codec 124 processes the video signals according to the format of the received video, as well as the format of the available near-end display used to display the captured video signal. In particular, mapping of the video signals may be performed automatically based on aspect ratio signalling (e.g., using the H.241 videoconferencing standard) and signalling of the videoconferencing system type (e.g., by the version string in the H.225 videoconferencing standard) discussed previously.

Figure 5A:
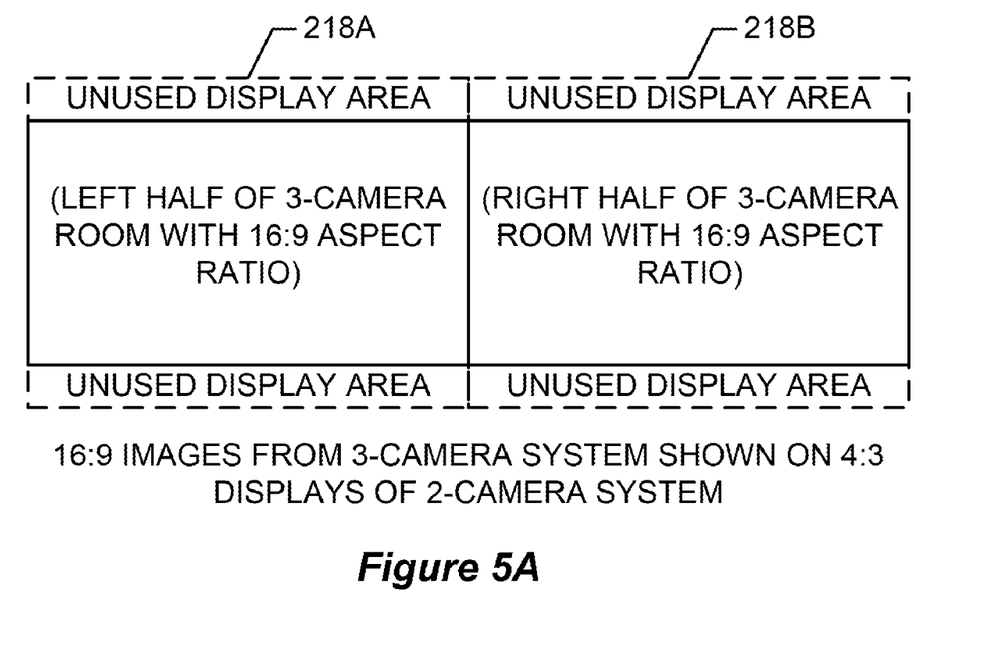
Figure 5B:
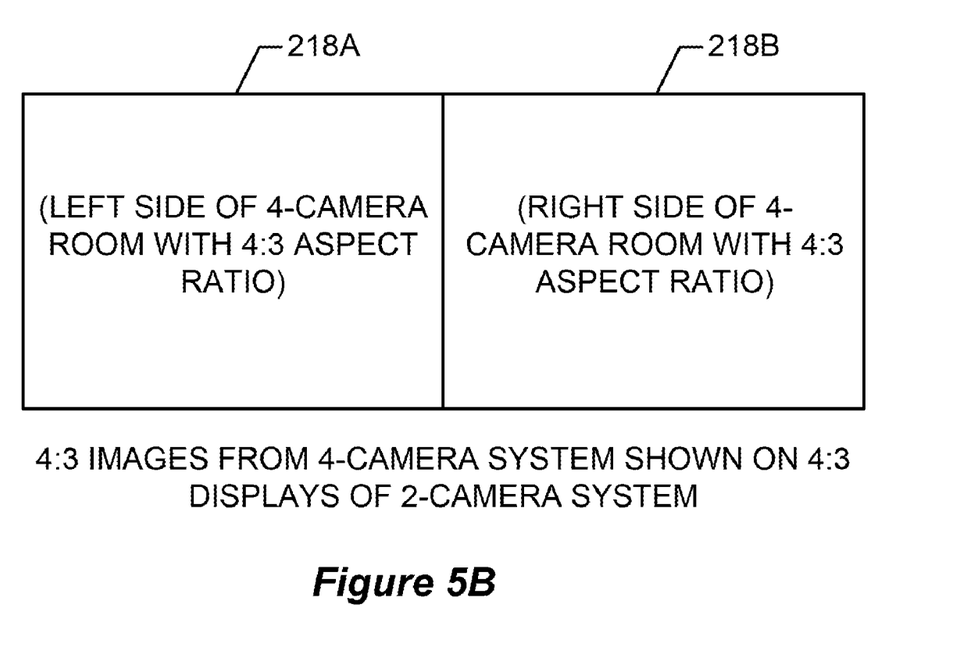

Two displays 118*a-b* are shown in FIGS. 5A-5B and can be from the videoconferencing system 200 of FIGS. 2A-2B used to receive video data from various videoconferencing systems. In FIG. 5A, each video display 118*a-b* has an aspect ratio of 4:3 and displays video data received from another system. In this case, the video data is received from two of the video cameras of a far-end, three-camera system (e.g., cameras 112*a* and 112*c* of the system 300 in FIG. 3B). Each of the far-end cameras may have a 16:9 aspect ratio. Accordingly, each video display 118*a-b* displays the appropriate video data using a letterbox effect similar to that used to display wide-angle video images in conventional 4:3 aspect ratio displays. In other words, a portion of the top and the bottom of each display 118*a-b* is not used. In this manner, the video from the far-end system appears as a single seamless image on the displays 118*a-b*.

In FIG. 5B, each video display 118*a-b*, having an aspect ratio of 4:3, receives video data from another system. In this case, the video is received from two of the video cameras of a four-camera system (e.g., cameras 112*b* and 112*c* of the system 400 in FIG. 4A). Each far-end camera (112*b*, 112*c*) may have the same 4:3 aspect ratio as the video displays 118*a-b*. Accordingly, each video display 118*a-b* displays the video data as it is sent from the far-end system using the same aspect ratio.

If a single video camera (e.g., camera 112) from a one-monitor videoconferencing system (e.g., system 100 in FIG. 1C) is used to send data to the exemplary two display system 200 having displays 118*a-b*, only one of the video displays (e.g., 118*a*) is used to display the far-end video, and the other (e.g., 118*b*) is not used. The letterbox effect could also be used in such a situation if the far-end camera from the one-monitor videoconferencing system (100) captures data in a wide-angle format.

Figure 6A:
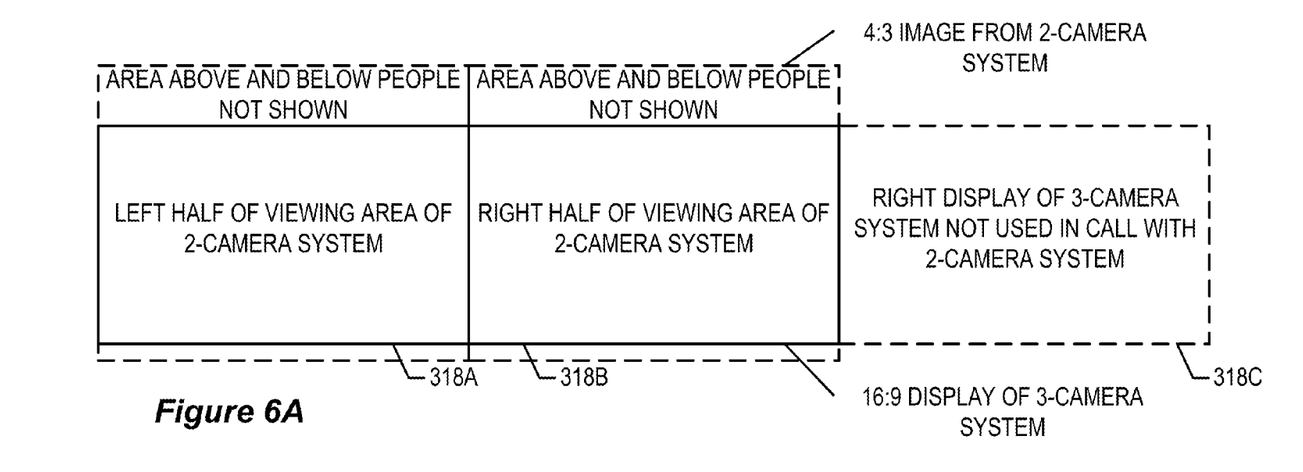
Figure 6B:
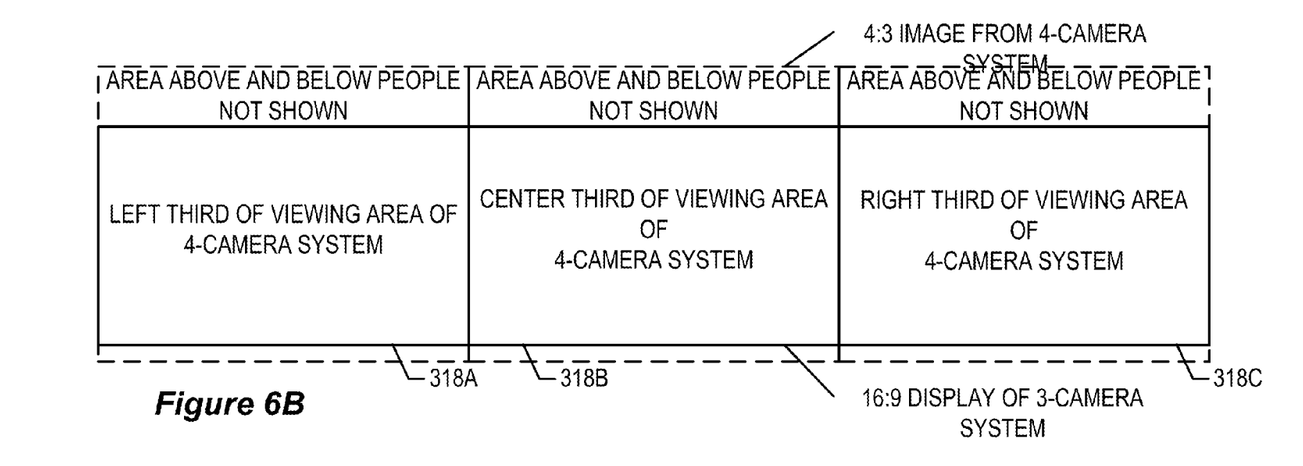

In FIGS. 6A-6B, three video displays 118*a-c* for a three-display system 300 as in FIGS. 3A-3B can have a wide (16:9) aspect ratio and may be used to receive video signals from various videoconferencing systems. In FIG. 6A, two video displays 118*a-b*, each of which have an aspect ratio of 16:9, receive video signals from another system, where the video cameras have a 4:3 aspect ratio. The other system may be, for example, the two-camera videoconferencing system 200 shown in FIG. 2A. As can be seen in FIG. 6A, the third video display 118*c* of the videoconferencing system is not used when receiving video from such a far-end two-camera system. Naturally, if only a single video source were received, only a single video display (e.g., 118*b*) would be used to display the video signal. In this instance, the central display 118*b* may be used as preferred because of its central location. This selection can be made based on the configuration information exchanged, which can include the position of displays for a system.

In the example shown in FIG. 6A, when an aspect ratio of the received video signal (4:3) is narrower than the aspect ratio (16:9) of the video displays to be used (118*a-b*), a common "pillaring" effect cannot be used to display the signals on the video displays. Briefly, such a pillaring effect implies that the side ends of the wide display (118*a-b*) are not used to display the video signal having a narrower aspect ratio. If such a pillaring effect were used in this case, there would be a gap between the two images in the displays 118*a-b* (i.e., a large portion at the interface of the two displays with no video data), which would result in a loss of a seamless videoconferencing image. Accordingly, the video cameras 112*a-b* of the far-end system that send video data to the video displays 118*a-b* are adjusted (e.g., using pan, tilt, and zoom, as described above) so that each video display 118-*b* displays the appropriate video data when a portion of the top and bottom of the signals sent from the video cameras 112*a-b* are cut off for display in each video display 118*a-b*. The video cameras 112*a-b*, ideally, are adjusted so that the portion of the 4:3 signal that is not used would not encompass people or other features in the far conference room that would be desired to be viewed. In one example and as shown in FIG. 6A, the top and bottom portions of the 4:3 video signal are cropped asymmetrically (e.g., more of the top is cropped than of the bottom), due to the room arrangement at the far-end.

FIG. 6B shows how the exemplary video displays 118*a-c* may be used to receive video signals from a videoconferencing system having more video cameras than available video displays. In this case, the far system is a four-camera system (e.g., system 400 shown in FIG. 4B), which has already been configured to send video signals from only three of its available four video cameras. In this example, all three of the video displays 118*a-c* are used to display one-third of the far-end conference site, using video signals sent from the video cameras 112*a-c*. Similar to the interface to the two-camera system shown in FIG. 6A, the tops and bottoms of the received video signals from the video cameras 112*a-c* are cropped such that a portion of the top and a portion of the bottom of the signals are removed, resulting in a seamless image across the three video displays 118*a-c*. Naturally, other viewing options are also possible. For example, a single video signal from a single-camera system may be displayed on one video display (e.g., 118*b*). Further, when a camera is used in a far videoconferencing system that produces video in an identical aspect ratio to that of the displays 118a-118c, the above-discussed cropping is not necessary.

Figure 7A:
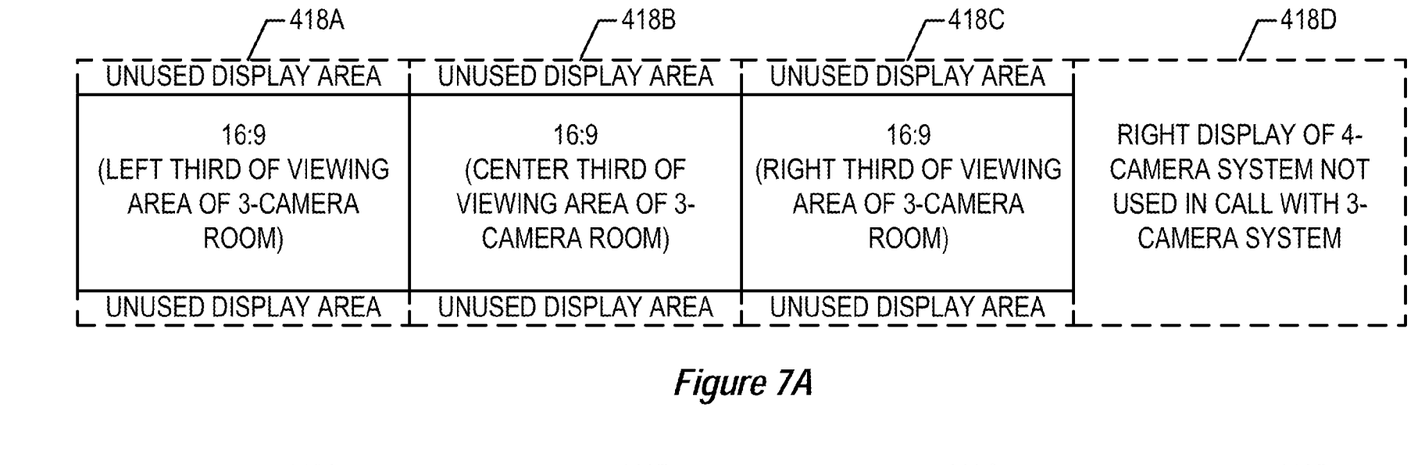
Figure 7B:
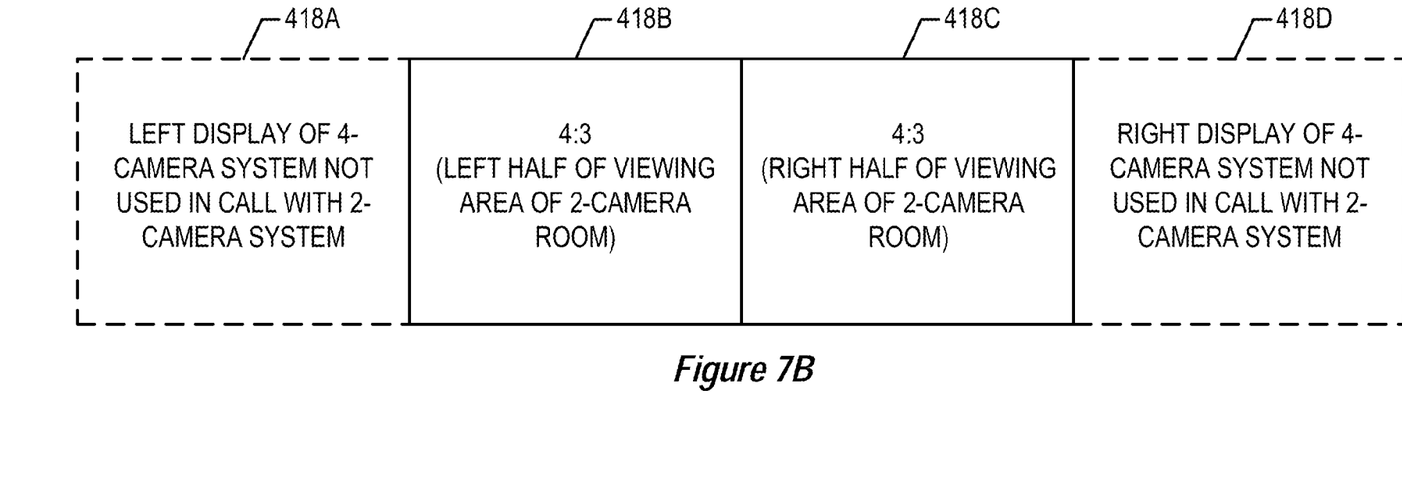

FIGS. 7A-7B show how an exemplary four-monitor video display 118a-d having a normal (4:3) aspect ratio (i.e., from the videoconferencing components 100a-d shown in FIG. 4A-4B) may be used to receive video signals from various videoconferencing systems. When fewer far-end video cameras are available than near-end video displays, only as many near-end video displays are used as far-end cameras that send video signals, as is shown in FIG. 7A. Thus, when a three-camera system is used at the far-end, as shown in FIG. 7A, only three near-end video displays 118a-c are used. Similar to the discussion of FIG. 5A, when the far-end aspect ratio of the far-end video cameras sending video signals is wider than the near-end aspect ratio of the near-end video displays 118a-c, then the near-end system uses a letterbox effect to display the far-end video signals.

When even fewer far-end video cameras are used, fewer corresponding near-end video displays are also used, as is shown in FIG. 7B. In this example, a two-camera far-end system is used, so only two corresponding near-end video displays (e.g., 118b, 118c) are used to display the far-end video signals from the two-camera system. Naturally, if a far-end system has only one far-end video camera available, then the near-end system uses only a single near-end display (e.g., 118b). Similarly, if the far-end system has more far-end video cameras available than four (i.e., the number of near-end displays available), only four far-end video cameras are used and the resulting video signals are displayed on all four near-end video displays 118a-d.

In each of the above examples shown in FIGS. 1-7, just as a different number of video cameras or video displays may be used depending on the capabilities and configuration of two communicating videoconferencing systems, the number of codecs used in a given system may also be varied depending on the capabilities and configuration of two communicating videoconferencing systems. For example, if a given near-end system has only two codecs available to process video signals, only two far-end video signals are sent from a configured far-end system. The actual number of codecs in a system may vary, and further, the capabilities of each codec may vary. For example, a single codec capable of handling multiple video streams can handle additional video signals from a far-end system, etc. The exchange of configuration information between the near and far-end systems can accommodate these varying capabilities between codecs so that adjustments similar to those discussed above can be accounted for between the systems.

Figure 8:
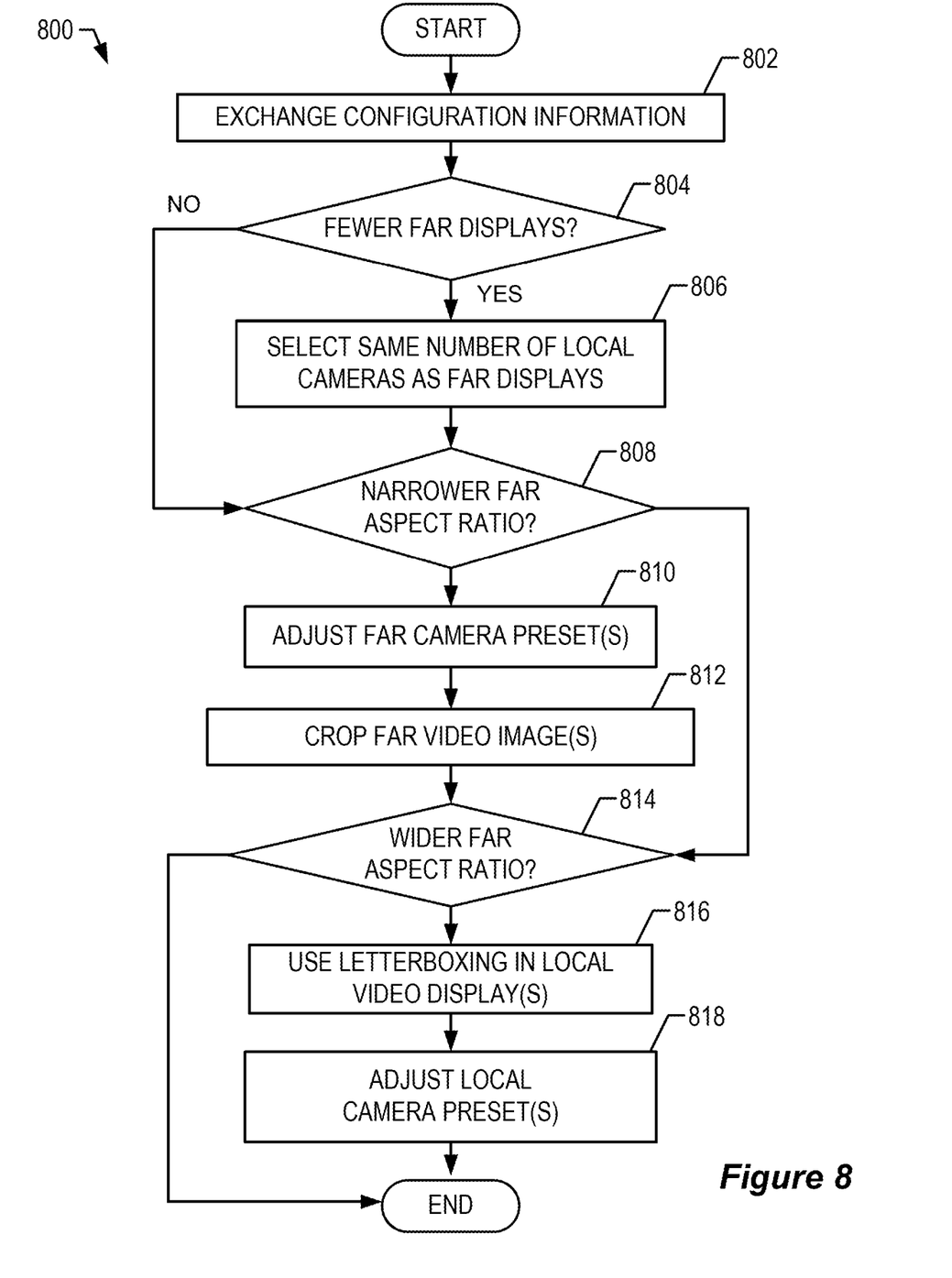
FIG. 8 illustrates a flow chart illustrating a configuration process of a videoconferencing system to create a video session with a realist presence.

FIG. 8 is a flowchart showing a configuration process 800 in which a videoconferencing system configures itself for broadcasting video signals to another system and receiving video signals from the other system. It should be understood that the following steps are exemplary, and the actual operation of a videoconferencing system may be altered from the steps the follow. Further, depending on the type of videoconference system, the particular room geometry, and other factors, it may be necessary upon a first videoconferencing session with another system to manually adjust the local components to establish a set of preset values for cameras and displays to use in future videoconferencing sessions. However, if the presets are known, configuration information is exchanged by a near-end system with a far-end system (Block 802). This configuration information may include information such as the number of video displays and video cameras available, and the aspect ratio of each display and camera, in addition to other information, and may be exchanged using the H.225 protocol, as discussed above.

The near-end system determines whether the far-end system has more or fewer far-end displays than the number of camera at the near-end system (Block 804). If there are fewer far-end displays, the near-end system adjusts its cameras so that the video signals sent to the far-end system correspond to the number and settings of the far-end displays available at the far-end system (Block 806). This may include, for example, using fewer cameras than the near-end system has available, or adjusting the pan, tilt, and/or zoom of the near-end camera(s) to correspond to the available displays at the far-end system.

Then, the near-end system determines whether the far-end system has a narrower aspect ratio than the near-end system (Block 808). For example, the near-end system may determine that the far-end cameras each use a 4:3 aspect ratio, while the near-end displays each use a 16:9 aspect ratio. If this is the case, then the far-end camera presets need to be adjusted so that the signal sent to the near-end system appears to cover the full field of view of the far-end cameras when the near-end video displays crop and display the video signals from the far-end cameras. In other words, the far-end camera's presets are adjusted so that the cropped video signals from each far-end cameras correspond to the aspect ratio of the near-end video displays (Block 810). Then, the near-end video displays crop the received video signals so that it fits in the viewable area of the displays (Block 812). If more than one near-end video display exists, the signals are cropped so that a continuous image is displayed on the multiple near-end video displays.

If the far-end system does not have a narrower aspect ratio than the near-end system, a determination is made as to whether the far-end system has a wider aspect ratio than the near-end system (Block 814). As an example, a near-end system that uses a 4:3 aspect ratio may make a determination as to whether a far-end system uses a 16:9 aspect ratio. If the far-end system does have a wider aspect ratio than the near-end system, the near-end displays use a letterboxing effect to display the video signal from the far-end system (Block 816). In a similar manner to the cropping discussed with reference to Blocks 808, 810, and 812 above, if multiple near-end video displays exist and more than one video signal is received for display, because the video signals are letterboxed, the multiple video signals will appear as a single seamless image on the near-end video displays. Further, if the far-end system has a wider aspect ratio than the near-end system, the near-end system adjusts the near-end camera presets so that when the video signals from the near-end cameras are cropped at the far-end system, the cropped video signals have the appearance of a single, seamless image.

Of course the steps shown in the above flowchart may be modified according to various embodiments of the invention. For example, while the steps of comparing aspect ratios is explained generically above as applying to both the cameras and the displays of the local and far systems, it should be understood that features related to the cameras and the displays may be analyzed in separate steps. For example, the aspect ratios of the video camera(s) and the video display(s) may be analyzed in separate steps.

One skilled in the art will appreciate that while each particular videoconferencing system 100, 200, 300, 400 is discussed as having a particular number of cameras and video monitors, and the video monitors for each system are described as using a particular aspect ratio, these features may be varied and are not limited to the embodiments discussed herein. In other words, different numbers of cameras and video monitors from different systems may be combined in manners similar to those discussed above. Similarly, other aspect ratios not discussed above may be sent and received by different systems in manners similar to those discussed above. Further, while a particular orientation of each system is shown according to various embodiments of the invention (e.g., in FIGS. 2-4), other orientations of cameras, displays, etc., may be used. In other words, video cameras and video displays may have different orientations which are accounted for by a user or administrator of the local system.

As an advantage of the various disclosed techniques, sending configuration information at the beginning of a videoconferencing using known protocols allows two dissimilar videoconferencing systems to automatically configure themselves to send appropriate video information to the other system and to receive video information from the other system. In other words, a telepresence effect may be automatically created in two dissimilar videoconferencing systems without human intervention. Further, an operator of each system does not have to manually position each camera to capture the correct field of view. Further, a setup time of communicating videoconferencing systems may be reduced.

While preferred embodiments of the invention have been disclosed, it should be understood that the disclosed results can be achieved in many different ways to the same useful ends as described herein. In short, it should be understood that the inventive concepts disclosed herein are capable of many modifications. To the extent such modifications fall within the scope of the appended claims and their equivalents, they are intended to be covered by this patent.

What is claimed is:

1. A videoconferencing configuration method, comprising:
   receiving far-end configuration information from a far-end videoconferencing system at a near-end videoconferencing system, the far-end configuration information indicative of video handling at the far-end system and indicative of a far-end number of video displays useable at the far-end system to display video;
   configuring one or more near-end video cameras based on the far-end configuration information to capture near-end video for sending to the far-end system by adjusting a near-end number of the one or more cameras for capturing near-end video so as to match the far-end number of video displays; and
   configuring one or more near-end video displays based on the far-end configuration information to display far-end video received from the far-end system,
   wherein the video handling by the near-end system is different than the far-end system.

2. The method of claim 1, further comprising sending near-end configuration information to the far-end system, the near-end configuration information indicative of video handling at the near-end system.

3. The method of claim 1, wherein configuring the one or more near-end video cameras comprises adjusting a view angle of the one or more cameras for capturing near-end video.

4. The method of claim 1, wherein the far-end configuration information comprises a far-end aspect ratio useable at the far-end system to capture video.

5. The method of claim 4, wherein configuring the one or more near-end video displays comprises adjusting a near-end aspect ratio for displaying video so as to match the far-end aspect ratio.

6. The method of claim 1, wherein the far-end configuration information comprises a far-end number of one or more far-end video cameras for capturing video at the far-end system.

7. The method of claim 6, wherein configuring the one or more near-end video displays comprises selecting a near-end number of video displays for displaying video so as to match the far-end number of the one or more far-end video cameras.

8. The method of claim 1, wherein the far-end configuration information comprises an identification of the far-end system.

9. The method of claim 8, further comprising determining the far-end configuration information of the far-end system based on the identification.

10. The method of claim 1, wherein the near-end system uses a different aspect ratio than the far-end system, and wherein configuring the one or more displays comprises configuring the one or more displays to accommodate the aspect ratio at the far-end system.

11. The method of claim 1, wherein the far-end configuration information is indicative of a number of video displays and an aspect ratio associated with the far-end system, and wherein the near-end system has a different number of video displays or uses a different aspect ratio than the far-end system.

12. A videoconferencing configuration method, comprising:
   receiving far-end configuration information from a far-end videoconferencing system at a near-end videoconferencing system, the far-end configuration information indicative of a video capturing capability at the far-end system and indicative of a far-end number of one or more far-end cameras useable to capture far-end video;
   determining whether one or more near-end video displays have a video displaying capability different from the video capturing capability of the far-end system; and
   configuring the video displaying capability of the one or more near-end video displays useable to display far-end video to match the video capturing capability of the one or more far-end cameras useable to capture the far-end video,
   wherein configuring the video displaying capability comprises selecting a near-end number of the one or more near-end video display for displaying far-end video so as to match the far-end number of the far-end cameras.

13. A videoconferencing configuration method, comprising:
   receiving far-end configuration information from a far-end videoconferencing system at a near-end videoconferencing system, the far-end configuration information indicative of a video displaying capability at the far-end system and indicative of a far-end number of one or more far-end video displays useable to display near-end video;
   determining whether one or more near-end cameras has a video capturing capability that is different from the video displaying capability of the far-end system; and
   configuring the video capturing capability of the one or more near-end video cameras useable to capture near-end video to match the video displaying capability of the one or more far-end displays useable to display the near-end video,
   wherein configuring the video capturing capability comprises adjusting a near-end number of the one or more cameras for capturing near-end video so as to match the far-end number of the video displays.

14. A near-end videoconferencing system, comprising:
a control unit configured to receive far-end configuration information from a far-end videoconferencing system, the far-end configuration information indicative of a physical configuration for handling video at the far-end videoconferencing system and indicative of a far-end number of video displays useable at the far-end system to display video;
one or more near-end cameras operatively coupled to the control unit and configurable to capture near-end video information for sending to the far-end videoconferencing system based on the far-end configuration information; and
one or more near-end video displays operatively coupled to the control unit and configurable to display far-end video information based on the far-end configuration information,
wherein the near-end videoconferencing system has a different physical configuration for handling video than the far-end videoconferencing system, and
wherein the control unit is configured to adjust a near-end number of the one or more cameras for capturing near-end video so as to match the far-end number of the video displays.

15. The system of claim 14, wherein the control unit is configured to send near-end configuration information to the far-end videoconferencing system.

16. The system of claim 14, wherein the far-end configuration information comprises an aspect ratio at the far-end for capturing video, and wherein the control unit is configured to adjust a near-end aspect ratio for displaying video so as to match the far-end aspect ratio.

17. The system of claim 14, wherein the far-end configuration information comprises a number of far-end video cameras at the far-end for capturing video, and wherein the control unit is configured to select a near-end number of the one or more video displays for displaying video so as to match the far-end number of the far-end video cameras.

18. The system of claim 14, wherein the far-end configuration information comprises a model identification of the far-end videoconferencing system.

19. The system of claim 18, wherein the control unit is configured to determine the number of video displays and the aspect ratio associated with the far-end videoconferencing system based on the model identification.

20. The system of claim 14, wherein the near-end videoconferencing system has a different number of video displays than the far-end videoconferencing system.

21. The system of claim 14, wherein the near-end videoconferencing system uses a different aspect ratio than the far-end videoconferencing system.

22. The system of claim 14, wherein the far-end configuration information is indicative of a number of video displays and an aspect ratio associated with the far-end videoconferencing system, and wherein the near-end videoconferencing system has a different number of video displays or uses a different aspect ratio than the far-end videoconferencing system.

23. The method of claim 12, further comprising sending near-end configuration information to the far-end system, the near-end configuration information indicative of video handling at the near-end system.

24. The method of claim 12, further comprising configuring one or more near-end video cameras based on the far-end configuration information to capture near-end video for sending to the far-end system.

25. The method of claim 24, wherein the far-end configuration information comprises a far-end number of video displays useable at the far-end system to display video; and wherein configuring the one or more near-end video cameras comprises adjusting a near-end number of the one or more cameras for capturing near-end video so as to match the far-end number of video displays.

26. The method of claim 24, wherein configuring the one or more near-end video cameras comprises adjusting a view angle of the one or more cameras for capturing near-end video.

27. The method of claim 12, wherein the far-end configuration information comprises a far-end aspect ratio useable at the far-end system to capture video; and wherein configuring the video displaying capability of the one or more near-end video comprises adjusting a near-end aspect ratio for displaying video so as to match the far-end aspect ratio.

28. The method of claim 12, wherein the far-end configuration information comprises an identification of the far-end system; and wherein the method further comprises determining the far-end configuration information of the far-end system based on the identification.

29. The method of claim 13, further comprising sending near-end configuration information to the far-end system, the near-end configuration information indicative of video handling at the near-end system.

30. The method of claim 13, wherein configuring the video capturing capability of the one or more near-end video cameras comprises adjusting a view angle of the one or more cameras for capturing near-end video.

31. The method of claim 13, further comprising configuring one or more near-end video displays based on the far-end configuration information to display far-end video received from the far-end system.

32. The method of claim 31, wherein the far-end configuration information comprises a far-end aspect ratio useable at the far-end system to capture video; and wherein configuring the one or more near-end video displays comprises adjusting a near-end aspect ratio for displaying video so as to match the far-end aspect ratio.

33. The method of claim 31, wherein the far-end configuration information comprises a far-end number of one or more far-end video cameras for capturing video at the far-end system; and wherein configuring the one or more near-end video displays comprises selecting a near-end number of video displays for displaying video so as to match the far-end number of the one or more far-end video cameras.

34. The method of claim 13, wherein the far-end configuration information comprises an identification of the far-end system; and wherein the method further comprises determining the far-end configuration information of the far-end system based on the identification.

* * * * *